United States Patent [19]

Horsfall

[11] 4,332,285
[45] Jun. 1, 1982

[54] TRACTOR POWER LIFT MECHANISMS

[75] Inventor: Harry Horsfall, Huddersfield, England

[73] Assignee: David Brown Tractors, Ltd., Huddersfield, England

[21] Appl. No.: 157,769

[22] Filed: Jun. 9, 1980

[30] Foreign Application Priority Data

Jun. 12, 1979 [GB] United Kingdom ............... 7920311

[51] Int. Cl.³ .............................................. F16K 31/44
[52] U.S. Cl. .................................... 251/240; 251/245; 91/444
[58] Field of Search ................... 137/596.1, 596.2; 91/444, 446, 447; 251/DIG. 4, 240, 245

[56] References Cited

U.S. PATENT DOCUMENTS

| | | | |
|---|---|---|---|
| 1,825,864 | 10/1931 | Harter | 251/DIG. 4 |
| 3,315,751 | 4/1967 | Hull et al. | 172/9 |
| 3,734,125 | 5/1973 | Bruce et al. | 251/245 |
| 3,978,666 | 9/1976 | Kelly et al. | 91/444 |
| 4,204,460 | 5/1980 | Andersen et al. | 91/447 |
| 4,218,957 | 8/1980 | Underwood | 91/446 |

Primary Examiner—H. Jay Spiegel

[57] ABSTRACT

A tractor hydraulic power lift mechanism has a known manually adjustable flow control valve for regulating the rate of lowering an implement. However, when the valve is so adjusted that a heavy ground-working implement is lowered to ground level at a rate slow enough not to cause damage, the implement is then very slow to penetrate the ground to the desired working depth. A manually operable overriding mechanism preferably actuated by the main hand lever of the power lift mechanism is therefore provided to enable the valve to be moved temporarily into its fully open position and allowed to return to its adjusted position. The overriding mechanism is operated as the implement reaches ground level and released when it reaches its working depth.

4 Claims, 1 Drawing Figure

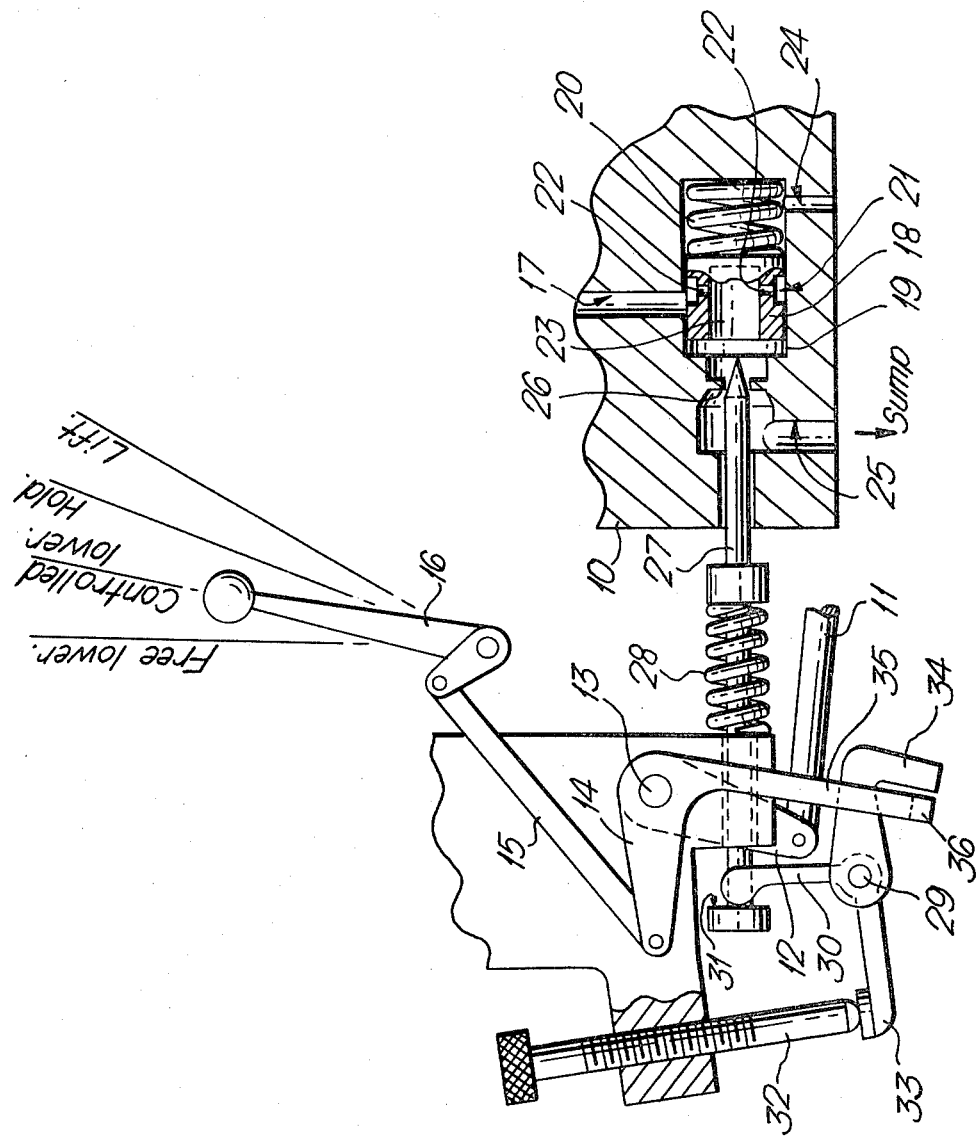

TRACTOR POWER LIFT MECHANISMS

BACKGROUND OF INVENTION

The invention relates to a hydraulic power lift mechanism, for an agricultural tractor or the like, of the kind having adjustable flow control means for enabling implements of different types and/or weights to be lowered at appropriate rates. Thus the rate of flow of oil to sump when lowering a heavy implement can be made considerably less than when lowering a light implement so that the rate of lowering is suited to the implement concerned. Although for a particular setting of the flow control means the rate of lowering is approximately the same for a light implement as for a heavy implement, the rate of lowering actually selected for a heavy implement, such as a fully-mounted multi-furrow one-way plough, must be considerably less than that selectively for a light implement because of the greater risk of damage to the heavy implement when it reaches the ground.

However, when the descent of a heavy implement is restrained by reducing the rate of flow of oil to sump, the implement reaches the ground without risk of damage, but is then slow to penetrate the ground to its required working depth. The object of the present invention is to avoid this disadvantage.

SUMMARY OF INVENTION

According to the invention, in a hydraulic power lift mechanism, for an agricultural tractor or the like, having flow control means with associated adjustment means for enabling different implements to be lowered at appropriate rates, overriding means are provided for enabling an implement to be lowered at the maximum possible rate when desired.

BRIEF DESCRIPTION OF DRAWINGS

A preferred embodiment of the invention will now be described, by way of example only, with reference to the accompanying drawing which is a semi-diagrammatic side elevation of an implement-lowering-rate control valve and overriding means therefor.

DESCRIPTION OF PREFERRED EMBODIMENT

Referring now to the drawing, a hydraulic power lift mechanism for an agricultural tractor includes a valve block 10 in which a main control valve (not shown) is slideable into "lift", "hold" and "controlled lower" positions by an operating linkage including a rod 11 pivotally connected to a first arm 12 rigidly secured on a shaft 13 to which a second arm 14 is also rigidly secured, the arm 14 being pivotally connected to one end of a link 15 the other end of which is pivotally connected to a hand control lever 16. In addition to being connected to the hand lever 16, said operating linkage is connected in well known manner to means (not shown) moveable automatically in accordance with variations in the draft force exerted by the tractor on an implement hitched to the power lift mechanism and/or to means (not shown) moveable automatically in accordance with variations in the height of the implement relative to the tractor. When said control valve is in its "controlled lower" position, it permits the flow of oil through a passage 17 to sump from a conventional single-acting hydraulic lift cylinder (not shown) of the power lift mechanism. Said mechanism also includes means for controlling said flow with associated adjustment means for enabling implements of different types and/or weights to be lowered at appropriate rates. The flow control means comprise a valve member 18 slideable in a bore 19 in the valve block 10, the passage 17 opening radially into the bore 19. The valve member 18 is urged towards one end of the bore 19 by a spring 20, and an annular groove 21 in its periphery is connected by radial holes 22 to an axial hole 23 which opens into the bore 19 at that end of the valve member 18 remote from the spring 20. A vent hole 24 connects that end of the bore 19 containing the spring 20 to the exterior of the valve block 10. That end of the bore 19 remote from the spring 20 communicates with an outlet port 25 by way of an orifice 26 capable of being adjustably restricted by an axially slideable needle valve 27. The needle valve 27 is urged in the closing direction by a co-axial spring 28, and is capable of being moved in the opening direction against the action of the spring 28 by a bell-crank lever fixed on a spindle 29, one arm 30 of said lever comprising a fork contacting a shoulder 31 on the needle valve 27. Means for enabling the angular position of the aforesaid bell-crank lever to be varied comprise a manually rotatable adjusting screw 32 which contacts the other arm 33 of said lever.

Overriding means are provided for enabling an implement to be lowered at the maximum possible rate when desired. Said means comprise an arm 34 rigidly secured to the spindle 29 and operable by movement of the hand control lever 16 beyond its "controlled lower" position, against the action of the spring 28 co-axial with the needle valve 27, into a "free lower" position so as to move the aforesaid bell-crank lever out of contact with the adjusting screw 32 and cause it to slide the needle valve 27 to the fully open position. This is achieved by forming the second arm 14 rigidly secured on the shaft 13 as one arm of another bell-crank lever the other arm 35 of which has a detent 36 adapted to abut against the arm 34 rigidly secured to the spindle 29, so that the arm 35 and the arm 34 together constitute lost-motion means. Thus said other bell-crank lever, the link 15 and the hand control lever 16 together constitute a hand control system for the power lift mechanism which is adapted to function also as manual control means for the overriding means.

In operation, when the hand control lever 16 is in its "controlled lower" position as shown in the drawing the overriding means are inoperative because the detent 36 on the arm 35 of said other bell-crank lever does not abut against the arm 34 rigidly secured to the spindle 29. The position of the needle valve 27 is therefore controlled by the adjusting screw 32, and said valve throttles the flow of oil through the orifice 26 and thus creates a back pressure in that end of the bore 19 remote from the spring 20 acting on the valve member 18. This back pressure moves the valve member 18 against the action of the spring 20 into the position shown in the drawing in which the annular groove 21 in said member is partially out of alignment with the passage 17 so as to control the rate at which oil flows to sump. When the hand control lever 16 is moved into its "free lower" position, the resulting additional movememt of the main control valve has no effect whatever on the flow of oil through the passage 17, but the detent 36 on the arm 35 of said other bell-crank lever abuts against the arm 34 rigidly secured to the spindle 29 and thereby moves the first-mentioned bell-crank lever 30, 33 angularly thus causing it to slide the needle valve 27 to the fully open position in which it does not throttle the flow of oil through the orifice 26. There is then no effective back pressure on the valve member 18 which is therefore moved by its spring 20 into a position in which its annular groove 21 is fully in alignment with the passage 17. Oil can accordingly flow to sump from said passage, and an implement can be lowered, at the maximum possible rate. When the hand control lever 16 is released by the operator, the spring 28 co-axial with the needle valve 27 moves said valve back into its preselected throttling position and in so doing drives the hand control lever 16 part-way towards its "controlled lower" position.

In a modification, the overriding means are provided with manual control means separate from the hand control lever.

I claim:

1. A hydraulic power lift mechanism, for an agricultural tractor or the like, having flow control means with associated adjustment means for variably throttling the flow to enable different implements to be lowered at appropriate rates and with means for overriding said adjustment means so as fully to open said flow control means and thereby enable an implement to be lowered at the maximum possible rate when desired said flow control means including an axially slideable needle valve;

said adjustment means comprising a spring urging the needle valve in the closing direction, a lever fixed on a spindle and capable of moving said valve in the opening direction against the action of said spring, and means for enabling the angular position of said lever about the axis of said spindle to be varied;

said lever being a bell-crank lever one arm of which contacts a shoulder on the needle valve, and the means for enabling the position of said lever to be varied comprising a manually rotatable adjusting screw which contacts the other arm of said lever.

2. A hydraulic power lift mechanism according to claim 1, wherein the overriding means comprise an arm rigidly secured to the spindle and operable by manual control means to move the lever out of contact with the means for enabling its angular position to be varied and to cause it to slide the needle valve to the fully open position.

3. A hydraulic power lift mechanism according to claim 2, wherein the manual control means comprise a hand control system for the power lift mechanism having "lift", "hold", "controlled lower" and "free lower" positions in the last of which it operates the arm rigidly secured to the spindle by way of lost-motion means.

4. A hydraulic power lift mechanism according to claim 3, wherein the hand control system comprises another bell-crank lever one arm of which is adapted to abut against the arm rigidly secured to the spindle so that said arms together constitute the lost-motion means, a hand control lever, and a link pivotally connected at one end to the other arm of said other bell-crank lever and at the other end to said hand control lever.

* * * * *